United States Patent
Chen et al.

(10) Patent No.: US 7,885,341 B2
(45) Date of Patent: Feb. 8, 2011

(54) SPATIAL FILTERING FOR IMPROVING COMPRESSION EFFICIENCY OF MOTION COMPENSATED INTERFRAME CODING

(75) Inventors: Wen-hsiung Chen, Sunnyvale, CA (US); Philip R. Graham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1507 days.

(21) Appl. No.: 11/255,543

(22) Filed: Oct. 21, 2005

(65) Prior Publication Data

US 2007/0092000 A1    Apr. 26, 2007

(51) Int. Cl.
*H04N 7/12* (2006.01)
(52) U.S. Cl. .............................. 375/240.29; 375/240.01
(58) Field of Classification Search ............. 375/240.29
See application file for complete search history.

(56) References Cited

U.S. PATENT DOCUMENTS

| | | | | |
|---|---|---|---|---|
| 5,089,889 | A * | 2/1992 | Sugiyama ............... | 375/240.12 |
| 5,731,836 | A * | 3/1998 | Lee ........................ | 375/240.16 |
| 5,986,713 | A * | 11/1999 | Odaka et al. ........... | 375/240.14 |
| 6,335,990 | B1 | 1/2002 | Chen et al. ................... | 382/261 |
| 7,085,318 | B2 * | 8/2006 | Kondo et al. ........... | 375/240.01 |
| 2005/0105627 | A1 * | 5/2005 | Sun et al. ................ | 375/240.29 |
| 2005/0169549 | A1 * | 8/2005 | Cha et al. ................... | 382/240 |
| 2005/0196063 | A1 * | 9/2005 | Guangxi et al. ............. | 382/261 |
| 2006/0013307 | A1 * | 1/2006 | Olivier et al. .......... | 375/240.16 |
| 2006/0165183 | A1 * | 7/2006 | Numajiri et al. ....... | 375/240.29 |

OTHER PUBLICATIONS

C. Kim, H.-H. Shih and C.-C. Jay Kuo. "Feature-Based Intra-Prediction Mode Decision for H.264." International Conference on Image Processing, 2004. IEEE, vol. 2, Oct. 24-27, 2004, pp. 769-772.
P. List, A. Joch, J. Lainema, G. Bjontegaard and M. Karczewicz. "Adaptive Deblocking Filter." IEEE Transaction on Circuits and Systems for Video Technology, vol. 13, Issue 7, pp. 614-619, Jul. 2003.
C. Cartwright, J. Bennett and G. Wilson. "Advanced Coding: Technology, Systems and Applications." Tandberg Television, UK. Broadcast Asia 2003 Paper. Downloaded Oct. 13, 2005. Available online at: http://www.broadcastpapers.com/sigdis/BCA03TandbergAdvancedCoding.pdf.

(Continued)

*Primary Examiner*—David P Rashid
(74) *Attorney, Agent, or Firm*—Dov Rosenfeld; Inventek (57) ABSTRACT

An apparatus, method, and carrier medium carrying computer-readable code to implement a method that includes generating a difference picture of an accepted picture of a time sequence of pictures minus an estimate of the previous picture in the sequence. The generating of the difference picture includes forming quantized coefficients and passing the quantized coefficients via a prediction loop to generate the estimate of the previous picture. A spatial filter is applied to at least a component of the difference picture such that the forming of quantized coefficients is from a spatially filtered difference picture. The spatial filter is a noise reducing spatial filter configured such that there is a fixed delay between the filter input picture and the filter output picture. The fixed delay is significantly less than the time between consecutive pictures in the time sequence.

33 Claims, 9 Drawing Sheets

OTHER PUBLICATIONS

W.H. Chen and D. Hein. "Recursive Temporal Filtering and Frame Rate Reduction for Image Coding." IEEE Journal on Selected Areas in Communications, vol. SAC-5, No. 7, Aug. 1987.

M. M. Ghandi and M. Ghanbari. "The H.264/AVC Video Coding Standard for the Next Generation Multimedia Communication." J. Iranian Association of Electrical and Electronics Eng., vol. 1, No. 2, 2004, pp. 3-14.

K. Chono and Y. Miyamoto. "Study on In-Loop Filtering Issues." Joint Video Team (JVT) of ISO/IEC MPEG & ITU-T Vceg, $2^{nd}$ Meeting: Geneva, CH, Jan. 29-Feb. 1, 2002.

G.J. Sullivan, P. Topiwala and A. Luthra. "The H.264/AVC Advanced Video Coding Standard: Overview and Introduction to the Fidelity Range Extensions." SPIE Conference on Applications of Digital Image Processing XXVII, Special Session on Advances in the New Emerging Standard: H.264/AVC, Aug. 2004.

T. Wiegand, G.J. Sullivan, G. Bjontegaard and A. Luthra. "Overview of the H.264/AVC Video Coding Standard." IEEE Transactions on Circuits and Systems for Video Technology, Jul. 2003.

\* cited by examiner

SPATIAL FILTERING FOR IMPROVING COMPRESSION EFFICIENCY OF MOTION COMPENSATED INTERFRAME CODING

BACKGROUND

The present invention is related to motion image compression, and in particular to a method, hardware, and software for motion compensated interframe transform coding, e.g., under the constraint of constant delay.

Motion compensated interframe coding is used in common transform coding methods, such as MPEG1, MPEG2, H.261, H.262, H.263, H.264/AVC, (also called MPEG-4 Part 10 and JVT), SMPTE VC-1 (similar to WM9V/Windows Media 9 Video), and so forth. For motion video, consider a sequence of pictures, e.g., video frames. Interframe coding includes dividing each input picture in the sequence into blocks. The following operations are performed for each block: generating a difference picture by subtracting from a newly accepted picture a motion compensated estimate of the previous picture in the sequence, the estimate being generated quantized transform coefficients for the previous picture in what is called herein a prediction loop. The difference picture is transformed to generate transform coefficients, and the transform coefficients are quantized and scaled to form the quantized transform coefficients. Motion vectors are determined for motion estimation, and used in the prediction loop. The quantized transform coefficients and the motion vectors are entropy coded, e.g., variable length coded for delivery.

Figure 1:
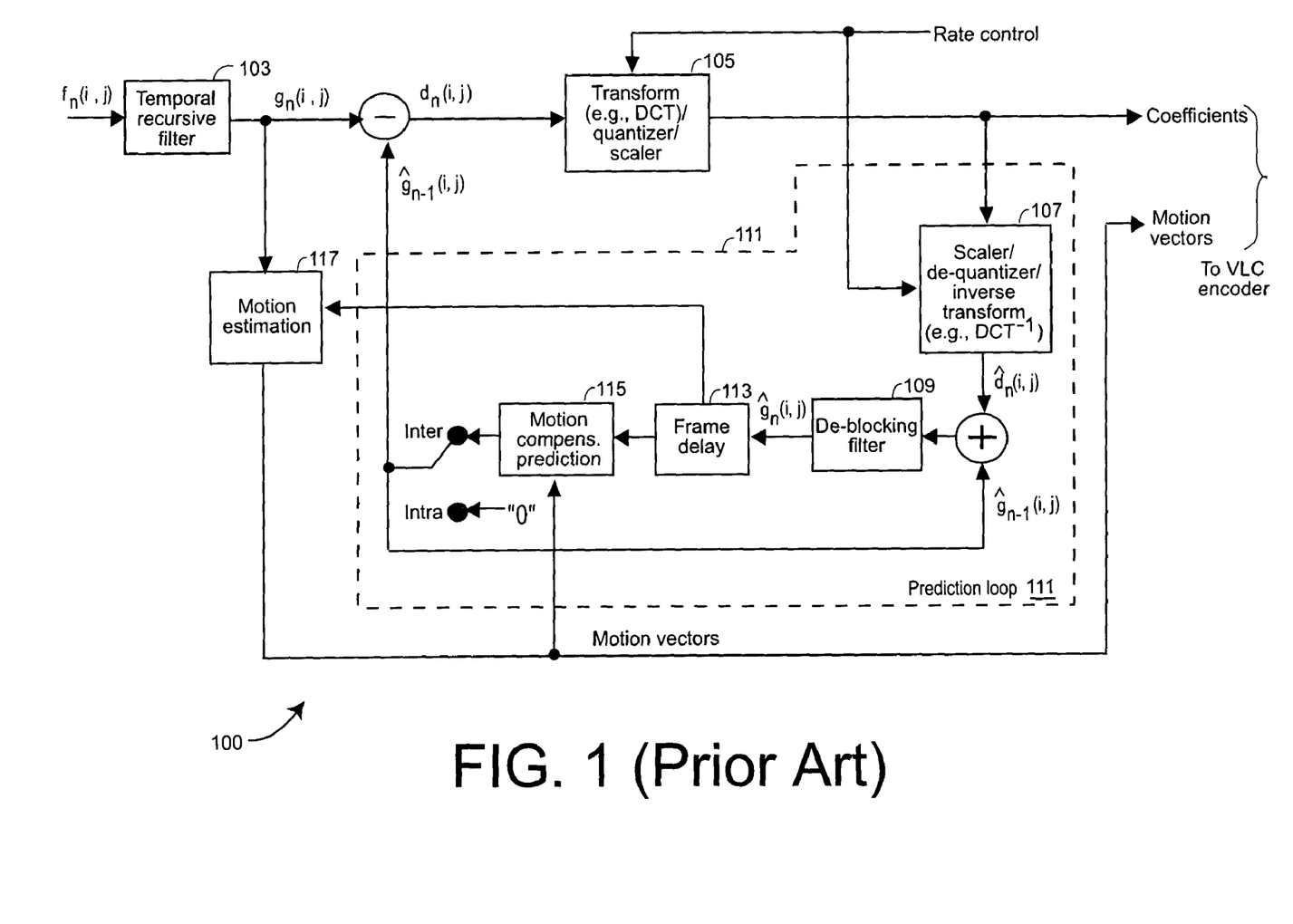
FIG. 1 shows a simplified block diagram of a motion compensated predictive coder that includes a temporal recursive filter.

FIG. 1 shows such a prior-art coder 100. A difference picture is generated by subtracting from an input picture an estimate of the previous picture in the sequence from a prediction loop 111. In block 105, the difference picture is transformed by a DCT or a DCT-like transform, and the transform coefficients are quantized and scaled. It is these quantized coefficients corresponding to the difference picture that are entropy coded by a variable length coder (VLC) for delivery. These quantized coefficients also are the input to the prediction loop 111 where, in block 107, the coefficients are scaled, de-quantized, and inverse transformed to produce a reconstructed difference picture. The reconstructed difference picture is added to the previous estimated picture to produce an estimate of the present picture. In some coders, e.g., coders that conform to the H.264/AVC standard, a de-blocking filter 109 is included in the prediction loop to filter block edges resulting from the prediction and residual difference coding stages of the decoding process. The filtering is applied on block boundaries. The filter coefficients or "strength" of the filter 109 are governed by a content adaptive non-linear filtering method. The de-blocking filtered estimated image is delayed in a frame delay 113 to produce the next previous image estimate. A motion compensated predictor 115 motion compensates the previous picture estimate based on motion vectors determined by a motion estimation block 117. The result is the estimate of the previous picture in the sequence.

We have found that the estimate of the previous picture in the sequence made from the previous quantized and reconstructed picture may contain a significant amount of quantization noise. This is especially true for quantized and reconstructed pictures of high complexity, high motion scenes, with quantization according to relatively large quantization scales. This leads to noise embedded in the difference picture. This noise, which, like the underlying noise-free difference picture, is transformed and coded, results in wasted bandwidth.

There thus is a need in the art for a method and for code and hardware to reduce or eliminate the noise.

Furthermore, in picture sequence coding, e.g., video coding, there is a need to operate under the constraint of a constant delay, so that synchronization is easier to maintain. Furthermore, it is important that such a constant delay be relatively small, e.g., as small approximately one a few video lines. This is particularly important in two-way video and voice communication, e.g., videoconferencing. Thus there is a need in the art for a method and for code and hardware to reduce or eliminate the noise in the difference picture under the constraint of constant delay.

Temporal noise reduction filtering such as temporal recursive filtering, that is recursive filtering picture-to-picture, e.g., frame to frame in the time domain, is known, and has proven to be an efficient noise reduction scheme that is used in video coding to preprocess the input moving picture sequence (the input video) prior to encoding. Such temporal filtering often is also used to post-process the output video prior to displaying.

The prior art motion compensated predictive coder 100 shown in FIG. 1 includes a temporal recursive filter 103 to filter the input picture sequence. The coder 100 is usable, for example, for MPEG-2, and for H.264/AVC coding, depending on such details as the type of transform used, the block size, the quantization, whether or not the de-blocking filter is present, and other details. Unfortunately, the temporal filter 103 generates an additional delay on one picture sequence interval, e.g., one frame interval, for one or both of the input and the output image, depending on whether such a filter is used at the input, the output, or both. This additional delay of 33 ms or 66 ms is generally acceptable for broadcast-quality TV application. However, it is not acceptable for such applications as videoconferencing where additional delay degrades the communication between participants.

Thus there is a need in the art for a method and for code and hardware to reduce or eliminate the noise in the difference picture under the constraint of constant delay, with the delay being relatively small so that, for example, two-way videoconferencing communication is not hampered.

SUMMARY

Described herein are apparatus embodiments, method embodiments, and carrier medium embodiments each carrying computer readable code to implement a method. One method embodiment includes generating a difference picture of an accepted picture of a time sequence of pictures minus an estimate of the previous picture in the sequence. The generating of the difference picture includes forming quantized coefficients and passing the quantized coefficients via a prediction loop to generate the estimate of the previous picture in the sequence. The method further includes spatial filtering at least a component of the difference picture using a spatial filter such that the forming of quantized coefficients is from a spatially filtered difference picture, the spatial filtering acting on a filter input picture and producing a filter output picture. The spatial filtering is noise reducing spatial filtering configured such that there is a fixed delay between the filter input picture and the filter output picture, the spatial filtering further configured such that the fixed delay is significantly less than the time between consecutive pictures in the time sequence.

While the operations in general are performed on a block-by-block bases, the spatial filtering of some lines and/or pixel locations in one block, e.g., the filters close to the edge of the block, may involve lines and/or pixel locations in a different neighboring block.

In one embodiment, the filter input picture is the difference picture and the filter output picture is the spatially filtered difference picture. In another embodiment, the filter input picture and the filter output picture are in the prediction loop, such that a spatially filtered estimate of the previous picture in the sequence is used to determine the spatially filtered difference picture.

One aspect of the invention is that the fixed delay is at most a one line plus one pixel delay.

In one embodiment, the spatial filtering includes recursive spatial filtering according to one or more filter coefficients. According to an aspect of the invention, the filter coefficients are adaptively set according to a measure of the relative amount of quantization noise in the predicted previous picture or a function thereof prior to any filtering, such that when there is relatively little quantization noise, relatively little filtering occurs.

Other aspects, features, and benefits will be clear from the detailed description and the claims provided herein.

DETAILED DESCRIPTION

Presented herein is a spatial filter, code for filtering, and a filtering method that carries out recursive spatial filtering for a difference picture, the difference picture generated by subtracting from a new picture of a sequence, a motion compensated picture estimated from a reconstructed version of the previous quantized picture.

Defining a picture block as consisting of lines, with each line a set of pixels, in one embodiment, the filtering is carried out with a delay of one line plus one pixel. In the case of video, the delay is equivalent to 0.07 ms for standard TV at D1 resolution and 0.03 ms for 1080i HDTV.

Note that the operations described herein are generally performed for each block of a picture. However, note also that spatial filtering along the pixels close to the block edge might involve other blocks.

Denote by index n the present picture, e.g., the present frame in the sequence of pictures, so that n-i denotes the previous picture, e.g., previous frame. Denote by i, j the two-dimensional coordinates of a picture. Assume that the i coordinate if the vertical coordinate that represents the different lines, and that the j coordinate is the horizontal coordinate, that is, pixels along a horizontal line. Denote by $f_n(i,j)$ the present picture, and denote by $\hat{f}_{n-1}(i,j)$ the estimate of previous picture obtained from a motion compensated and quantized previous picture in the sequence. Denote the present difference image by $d_n(i,j)$. Then $$d_n(i,j) = f_n(i,j) - \hat{f}_{n-1}(i,j) \qquad \text{(Eq. 1)}$$

FIG. 1 shows a simplified block diagram of a prior art motion compensated predictive coder 100 that includes a temporal recursive filter 103. The filter 103 typically presents a delay of one picture period, e.g., frame period, which is unacceptable in some applications.

Figure 2:
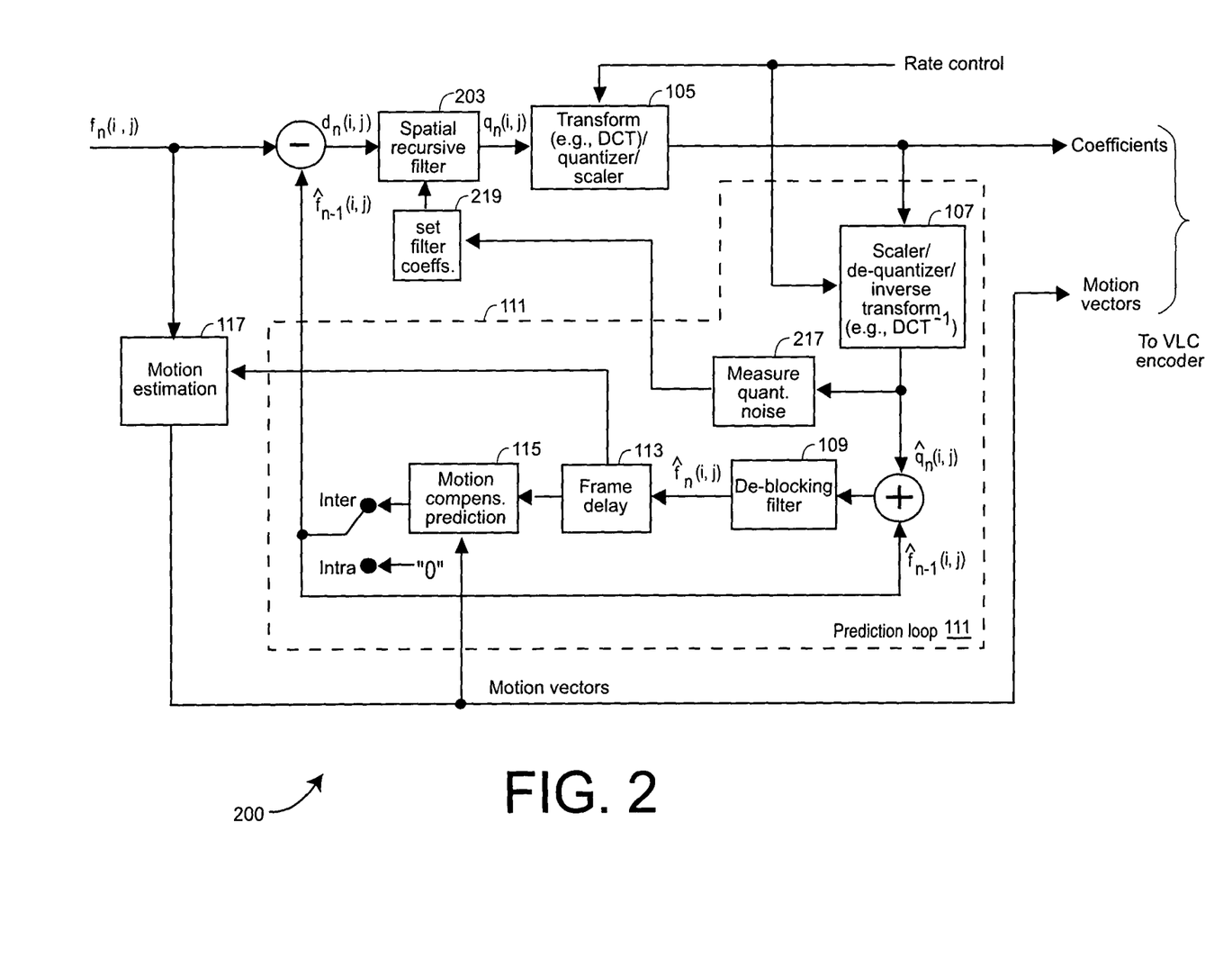
FIG. 2 shows a simplified block diagram of a motion compensated predictive coder that includes a spatial recursive filter according to an aspect of the present invention.

FIG. 2 shows a simplified block diagram of an embodiment of a motion compensated predictive coder 200 that includes an embodiment 203 of a spatial recursive filter that implements one or more aspects of the present invention. Compared to FIG. 1, where the filter 103 produces a delay of at least one picture sequence period to deal with the temporal recursive filtering, one aspect of the present invention is that the spatial filter 203 produces a relatively small and fixed delay.

In one embodiment, the fixed delay is of approximately one line. In one embodiment, the delay is one line plus one pixel, where, for the case of m pixels per line, by one pixel is meant $(1/m)'$ th of a line delay.

Figure 3A:
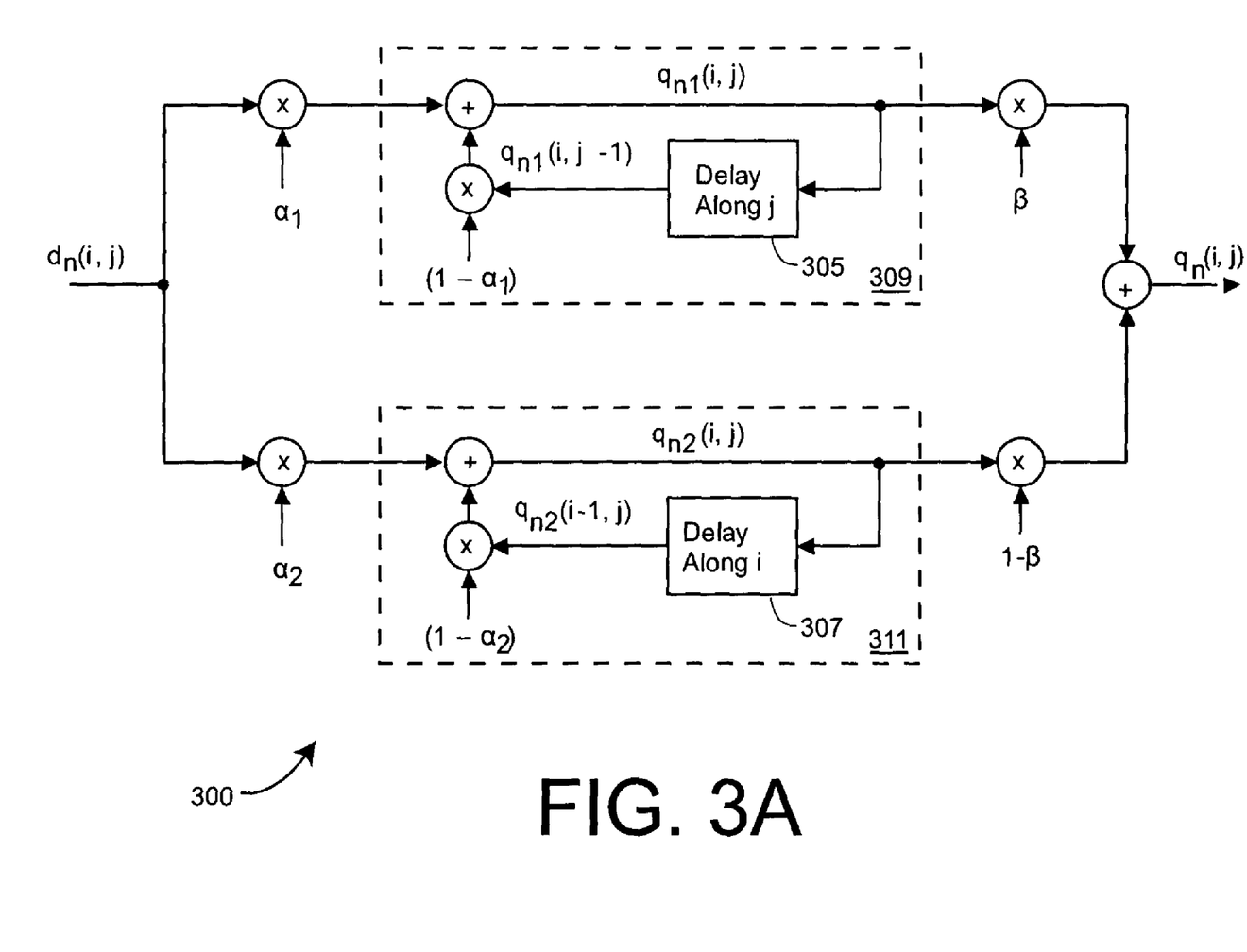
FIG. 3A shows a simplified block diagram of one embodiment of a spatial recursive filter that, for example, can be used in the coder shown in FIG. 2.

FIG. 3A shows a simplified block diagram of one embodiment 300 of the spatial recursive filter 203 of FIG. 2. The filtering operation is carried out as soon as at least one line and at least one pixel of the difference picture is available which meets the constraint of minimum delay. The two-dimensional spatial filter embodiment 300 operates as follows on the filter's input picture which is a picture in two dimensions. A first filtered picture is obtained by one-dimensionally recursively spatially filtering the difference picture in a first dimension, e.g., the j-direction. Also, a second filtered picture is obtained by one-dimensionally spatially filtering the difference picture in the second dimension, e.g., the i-direction perpendicular to the j-direction. Denote the first filtered picture by $q_{n1}(i,j)$, and the second filtered picture by $q_{n2}(i,j)$ for the n'th input picture. A spatially filtered difference picture—the difference picture filtered by the filter 203—is obtained by a weighted sum of the first and second filtered picture. Denote this spatially filtered picture by $q_n(i,j)$. Then $$q_{n1}(i,j) = \alpha_1 d_n(i,j) + (1-\alpha_1) q_{n1}(i,j-1) \qquad \text{(Eq. 2a)}$$

$$q_{n2}(i,j) = \alpha_2 d_n(i,j) + (1-\alpha_2) q_{n2}(i-1,j) \qquad \text{(Eq. 2b)}$$

and $$q_n(i,j) = \beta q_{n1}(i,j) + (1-\beta) q_{n2}(i,j) \qquad \text{(Eq. 2c)}$$

where $q_{n1}$ and $q_{n2}$ represent filtered picture along jth and ith directions, respectively constants $\alpha_1, \alpha_2$, and $\beta$ are each in the range of 0 to 1, that is, $0 \leq \alpha_1 \leq 1$, $0 \leq \alpha_2 \leq 1$, and $0 \leq \beta \leq 1$.

It should be noted from Eq. 2a that the first filtered picture $q_{n1}(i,j)$ in the present line i is the weighted sum of the difference picture $d_n(i,j)$ in the present line i and the first filtered picture $q_{n1}(i,j-1)$ in the pixel position on the present line.

Likewise, from Eq. 2b, the second filtered picture $q_{n2}(i,j)$ in the present pixel j is the weighted sum of the difference picture $d_n(i,j)$ in the present pixel j and the second filtered picture $q_{n2}(i-1,j)$ in the previous line (i−i). Therefore, the filter implementing Eq. 2a introduces a one line delay, and the filter implementing Eq. 2b introduces a one pixel delay.

Referring again to FIG. 3A, one implementation 300 of the filter of Eqs. 2a, 2b, and 2c is as shown. Delay elements 305 and 307 produce one-pixel and one-line delays, respectively. Those in the art will understand that there are many ways to implement the filter of FIG. 3A in hardware. For example, the elements shown in dotted block 309 can be implemented by a one-pixel accumulator add and coefficient multiplier, while the elements shown in dotted block 311 can be implemented by one-line accumulator add and coefficient multiplier.

Figure 3B:
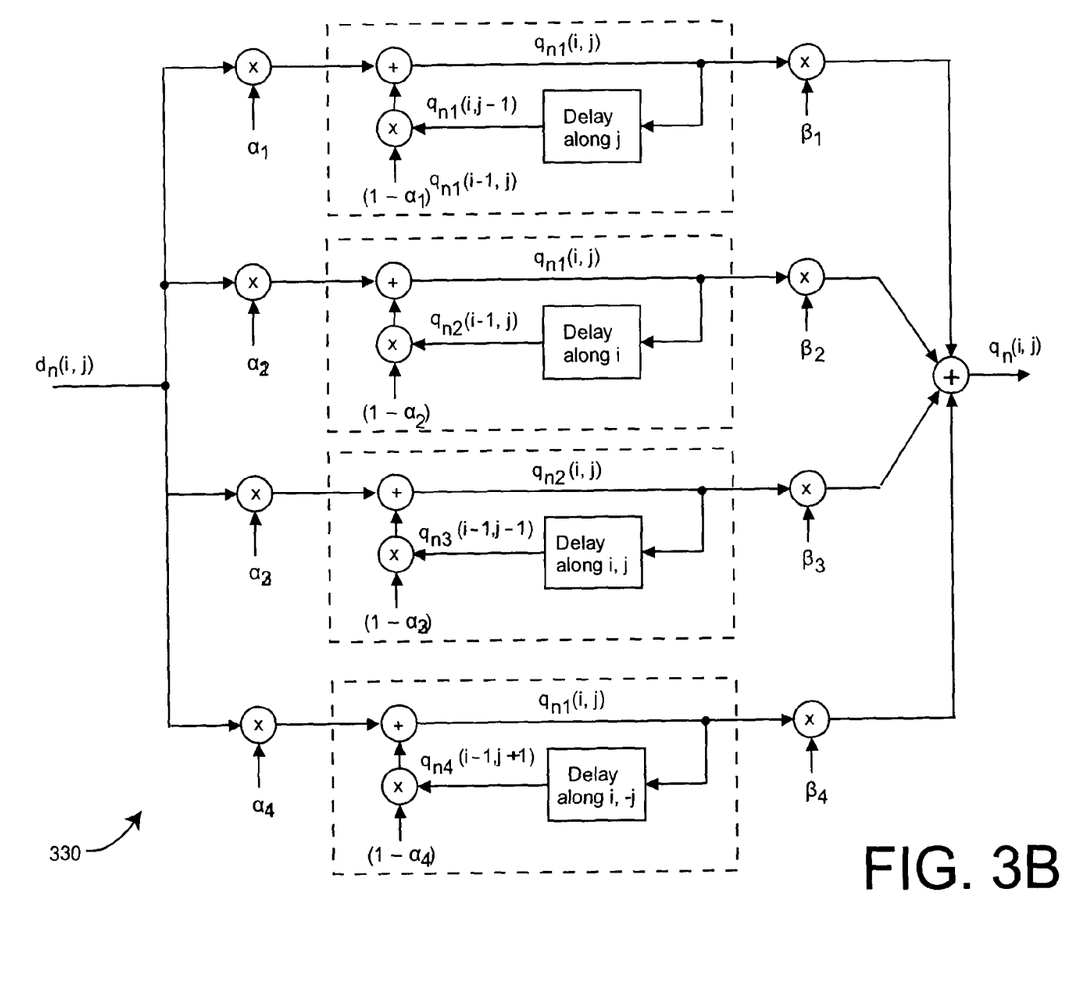
FIG. 3B shows a simplified block diagram of another embodiment of a spatial recursive filter that, for example, can be used in the coder shown in FIG. 2.

FIG. 3B shows a second alternate embodiment 330 of a spatial recursive filter that includes a plurality of one-dimensional filters. This embodiment applicable when previous lines are assumed completely filtered prior to any filtering on a current line. In such an embodiment, there is no need to restrict using only past pixel location output values on the previous line (i−1) to determine the present output of the filter at line i, pixel j, that is the filter need not be causal for past line(s) because the filter outputs for such lines are assumed to be determined. The delay amount is not affected by removing this causality requirement. For such a filter, there are four recursion coefficients defined: $\alpha_1$, $\alpha_2$, $\alpha_3$, and $\alpha_4$ for describing how much of the preset line past pixel, past line, present pixel, past line, part pixel, and past line future pixel to include. Constants $\alpha_1$, $\alpha_2$, $\alpha_3$, and $\alpha_4$ are each in the range of 0 to 1. There also are four β parameters $\beta_1$, $\beta_2$, $\beta_3$, and $\beta_4$, also in the range of 0 to 1, with $\beta_1+\beta_2+\beta_3+\beta_4=1$. The filters are defined by $$q_{n1}(i,j)=\alpha_1 d_n(i,j)+(1-\alpha_1)q_{n1}(i,j-1) \qquad (Eq.\ 2a)$$

$$q_{n2}(i,j)=\alpha_2 d_n(i,j)+(1-\alpha_2)q_{n2}(i-1,j) \qquad (Eq.\ 2b)$$

$$q_{n3}(i,j)=\alpha_3 d_n(i,j)+(1-\alpha_3)q_{n3}(i-1,j-1) \qquad (Eq.\ 2)$$

$$q_{n4}(i,j)=\alpha_4 d_n(i,j)+(1-\alpha_4)q_{n4}(i-1,j+1) \qquad (Eq.\ 2d)$$

and $$q_n(i,j)=\beta_1 q_{n1}(i,j)+\beta_2 q_{n1}(i,j)+\beta_3 q_{n1}(i,j)+\beta_4 q_{n1}(i,j) \qquad (Eq.\ 2e)$$

Another aspect of the invention is that the filter coefficients are adaptively set according to a measure of the amount of quantization noise relative to the amount of signal in the predicted previous picture or a function thereof prior to any filtering, such that when there is little quantization noise relative to the signal, relatively little filtering occurs.

The quantization noise is related to the quantization scale which is, for example, 0 to 31 for H.261, H.262, H.263, MPEG1, MPEG2 and MPEG4, and 0 to 51 for H.264 and MPEG4-AVC. This scale is part of the rate control. In one embodiment, the measure of relative amount of quantization noise is a measure of the amplitude of the difference picture relative to the quantization scale. This is an inverse measure in that for a fixed quantization scale, a high amplitude is assumed to be indicative of a low amount of quantization noise. The inventors have found that for a fixed quantization scale, a relatively large-amplitudes in $d_n(i,j)$ generally represent a signal that is significantly larger than quantization noise. One aspect if the invention is that for a fixed quantization scale, for a relatively low amount of quantization noise, e.g., sufficiently large magnitude of the difference picture, the coefficients $\alpha_1$ and $\alpha_2$ are selected to be relatively large, e.g., high values close to 1, so that relatively little filtering is carried out by the filter 203. On the other hand, the inventors have found that for a fixed quantization scale, a relatively small amplitude values in $d_n(i,j)$ might suggest quantization noise rather than signal. Another aspect of the invention is that for a relatively high amount of quantization noise, e.g., sufficiently small magnitude of the difference picture relative to the quantization scale, the coefficients $\alpha_1$ and $\alpha_2$ are selected to be relatively small, e.g., to have relatively low values closer to 0 so that there is a lot of filtering. In between, the coefficient values are selected to be between 0 and 1, and in one embodiment, to vary linearly between 0 and 1.

Figure 4A:
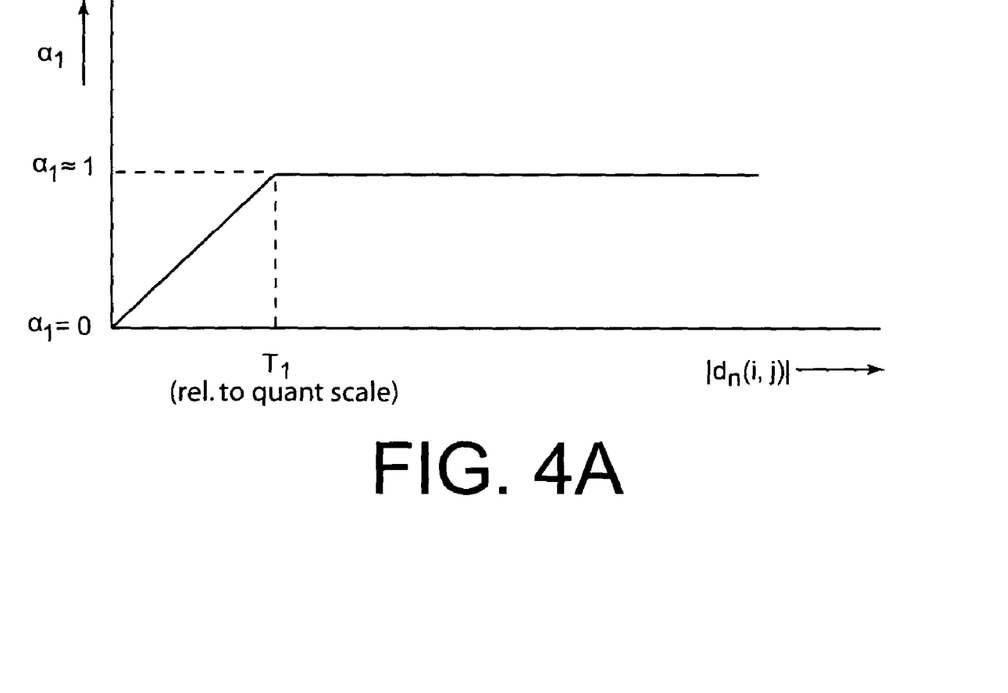
FIGS. 4A and 4B show functions that are used to select the two filter coefficients in each of the two-dimensional directions according to an indication of how much quantization noise can be expected in the difference picture, according to an aspect of the invention.
Figure 4B:
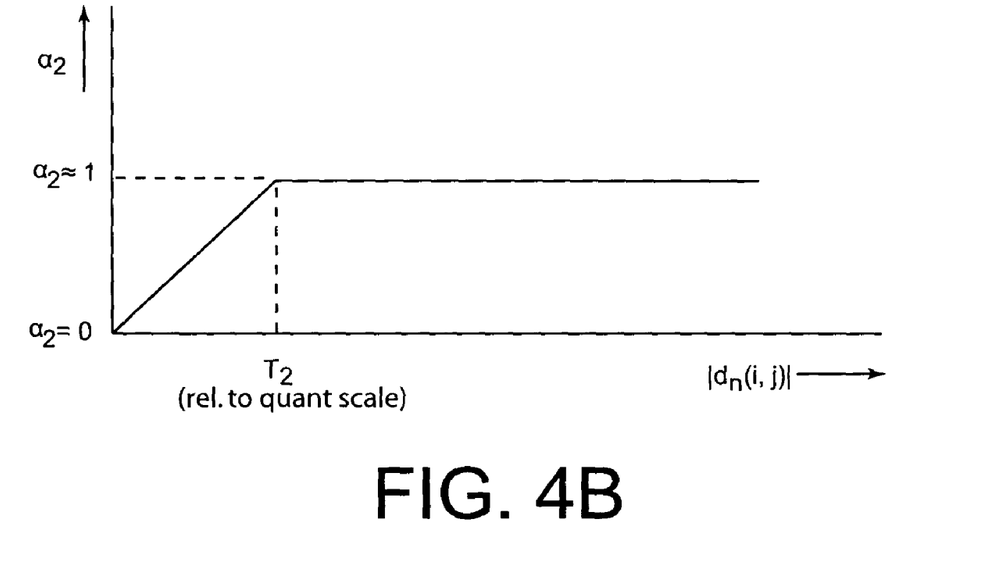

FIGS. 4A and 4B show the non-linear nature of the filtering coefficients $\alpha_1$ and $\alpha_2$, respectively, according to aspects of the invention, for a particular quantization scale. Denote by $T_1$ and $T_2$ thresholds dependent on quantization scales. In particular, the larger the quantization scale, the larger is the threshold $T_1$ or $T_2$. As can be seen, the filtering coefficient $\alpha_1$ is nearly 1 when $|d_n(i,j)| \geq T_1$ and $\alpha_1$ is less than 1 and approximately proportional to a measure of the amplitude in the difference image when $|d_n(i,j)| < T_1$. Similarly, the filtering coefficient $\alpha_2$ is nearly 1 when $|d_n(i,j)| \geq T_2$ and $\alpha_2$ less than 1 and approximately proportional to a measure of the amplitude in the difference picture when $|d_n(i,j)| < T_2$.

In one embodiment, the thresholds corresponding to the coefficients are selected from a set of pre-selected thresholds according to one or both of the type of image, and the amount of bandwidth available for delivery. For example, if the picture is from HDTV video, the threshold is selected to have a low T value so that relatively little filtering is carried out. As another example, if there is very limited bandwidth available for delivery, the threshold value is selected so that relatively more filtering is carried out.

In one embodiment, the measure of relative amount of quantization noise is determined from the difference image and the quantization scale. In the embodiment shown in FIG. 2, the measure of the relative amount of quantization noise is obtained by block 217 from the reconstructed difference picture after the de-quantization and inverse transforming, and the quantization scale. Block 219 is configured to determine the coefficients according to the measure of the relative amount of quantization noise.

The value β defines the contribution of filter along i-direction relative to the contribution along the j-direction. If the pixel correlations along the i-direction and j-direction are relatively equal, then one selects β=0.5. In one embodiment, the value β is set according to an estimate of relative correlations in the i-,j-directions.

Figure 5A:
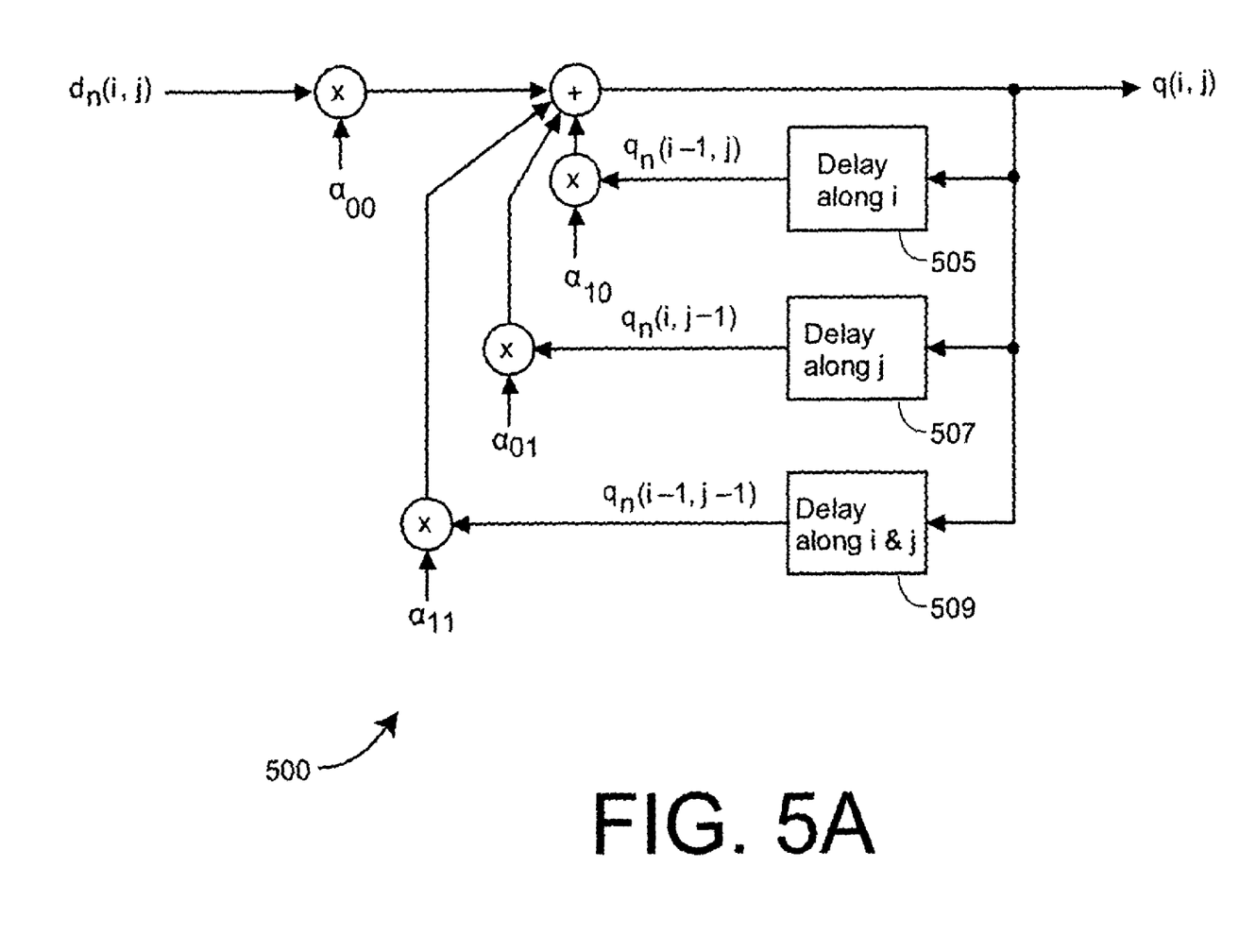
FIG. 5A shows a simplified block diagram of an alternate embodiment of a spatial recursive filter that, for example, can be used in the coder shown in FIG. 2.

The embodiment described by Eqs. 2a, 2b, and 2c are relatively simple in that they involve separate one-dimensional recursive spatial filtering in the i-and j-directions. FIG. 5A shows a simplified block diagram of a first alternate embodiment of a spatial recursive filter that true two-dimensional spatial recursive filtering described by:

$$q_n(i,j)=\alpha_{00}d_n(i,j)+\alpha_{10}q_n(i-1,j)+\alpha_{01}q_n(i,j-1)+\alpha_{11}q_n(i-1,j-1) \qquad (Eq.\ 3)$$

where $\alpha_{00}$, $\alpha_{01}$, $\alpha_{10}$, and $\alpha_{11}$ are coefficients that describe the relative weightings put on the i-and j-directions, and scaled so that the filtered difference picture $q_n(i,j)$ has the same amplitude scale as the difference picture $d_n(i,j)$. Delay element 505 is in the recursive path in the i-direction, delay element 507 is in the recursive path in the j-direction, and delay element 509 is in both the i-and j-directions. If the pixel correlations along the i-direction and j-direction are relatively even, then $\alpha_{01}=\alpha_{10}$.

Figure 5B:
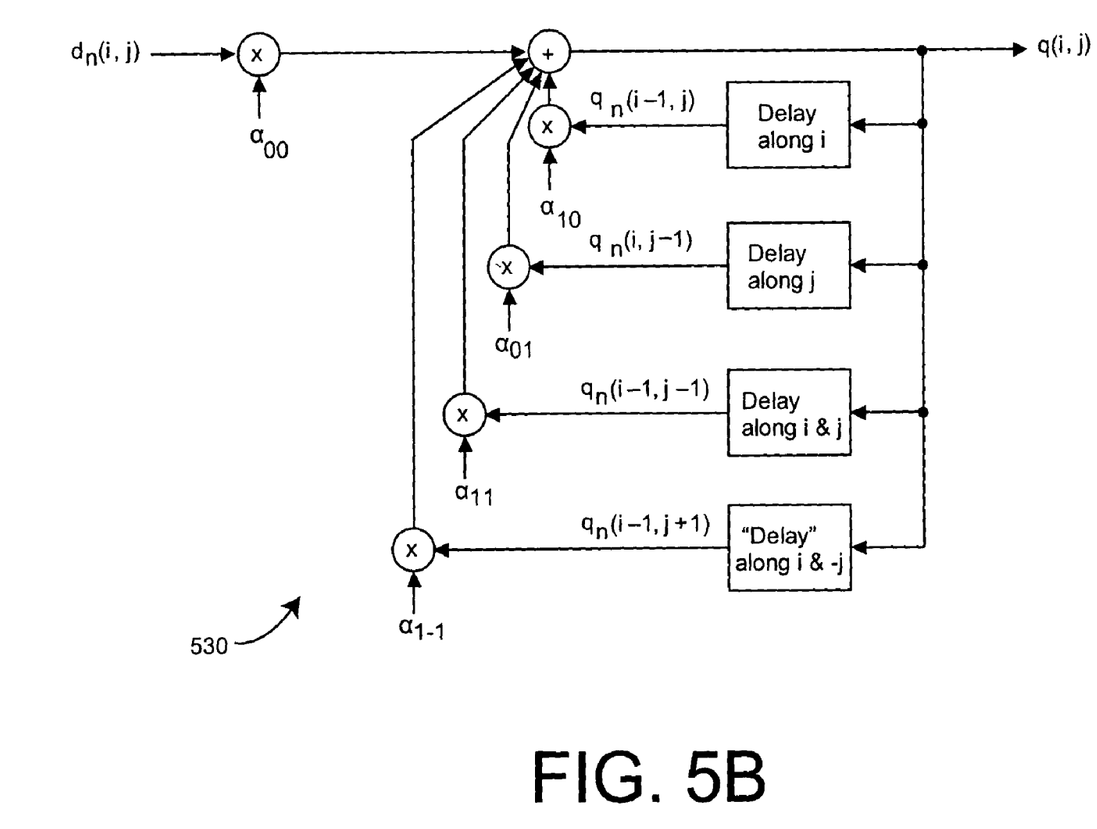
FIG. 5B shows a simplified block diagram of another alternate embodiment of a spatial recursive filter that, for example, can be used in the coder shown in FIG. 2.

FIG. 5B shows a second alternate embodiment of a spatial recursive filter that uses true two-dimensional spatial recursive filtering that is applicable when previous lines are assumed completely filtered prior to any filtering on a current line. In such an embodiment, there is no need to restrict using only past pixel location output values on the previous line to determine the present output of the filter, that is the filter need not be causal for past line(s) because the filter outputs for such lines are assumed to be determined. The delay amount is not affected by removing this causality requirement. The filter shown in FIG. 5B is described by $$q_n(i,j)=\alpha_{00}d_n(i,j)+\alpha_{10}q_n(i-1,j)+\alpha_{01}q_n(i,j-1)+\alpha_{11}q_n(i-1,j-1)+\alpha_{1-1}q_n(i-1,j-1) \quad \text{(Eq. 4)}$$

where $\alpha_{00}$, $\alpha_{01}$, $\alpha_{10}$, $\alpha_{11}$, and $\alpha_{1-1}$ are coefficients that describe the relative weightings put on the i-and j-directions, and scaled so that the filtered difference picture $q_n(i,j)$ has the same amplitude scale as the difference picture $d_n(i,j)$.

While one embodiment includes a spatial filter in the direct signal path of the difference picture, alternate embodiments include the spatial filter in the prediction loop, such that a spatially filtered estimate of the previous picture in the sequence is used to determine the spatially filtered difference picture.

When the filter is placed in the prediction loop, a decoder that has a similar filter is used for decoding, while for the embodiment of FIG. 2, any decoder may be used.

Figure 6:
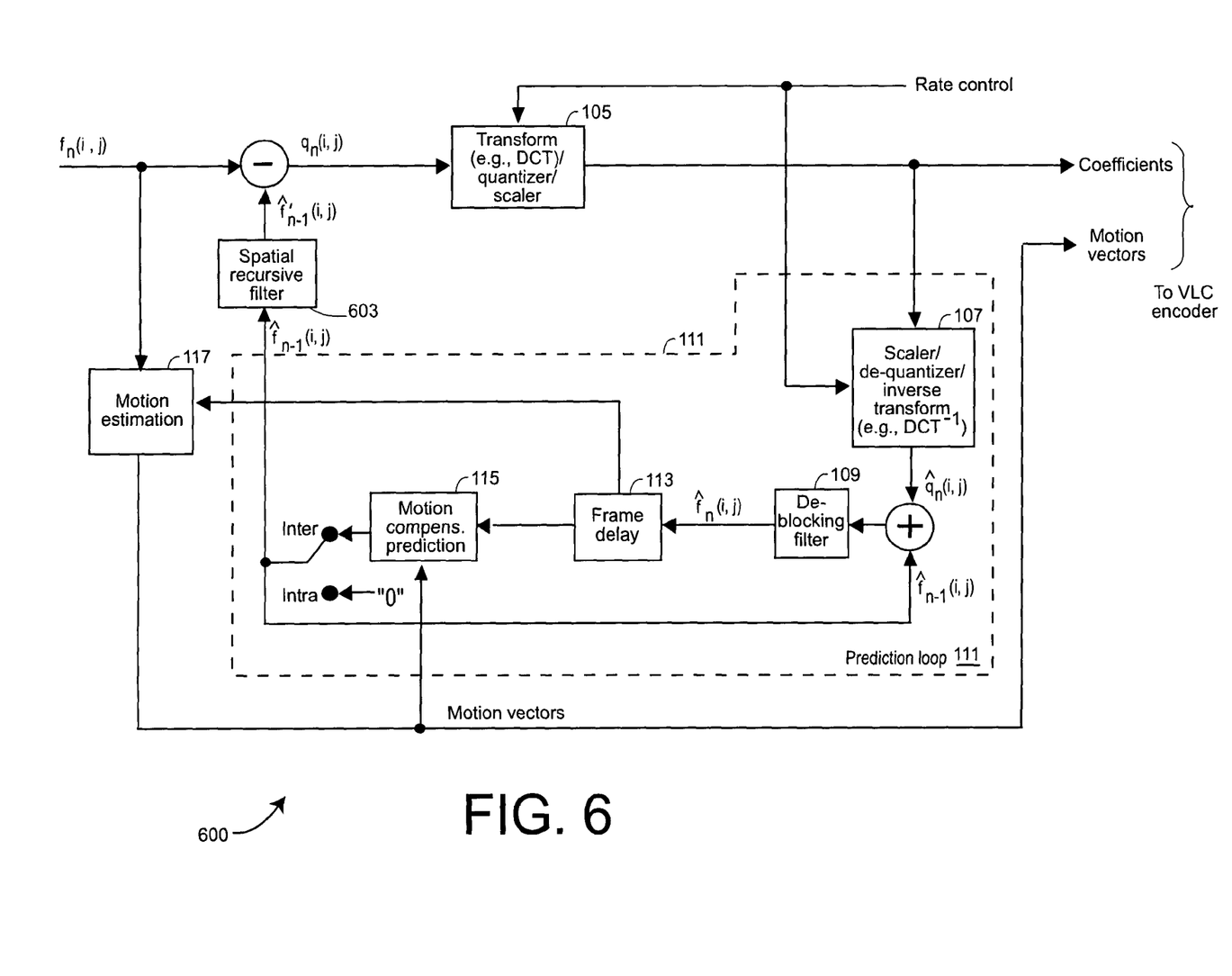
FIG. 6 shows a simplified block diagram of a first alternate embodiment of a motion compensated predictive coder that includes a spatial recursive filter in the prediction loop.

FIG. 6 shows a simplified block diagram of a first alternate embodiment 600 of a motion compensated predictive coder that includes a spatial recursive filter 603 in the prediction loop. The filter input picture is the estimate of the previous picture in the sequence, and provides as the filter output picture the spatially filtered estimate of the previous picture. Thus, the filter 603 filters $\hat{f}_{n-1}(i,j)$, the estimate of previous picture obtained from a motion compensated and quantized previous picture in the sequence to produce a filtered estimate $\hat{f}_{n-1}(i,j)$. This is subtracted from the present picture to produce the filtered difference picture $q_n(i,j)$. How to design filter 603 from details above of how to design filter 203 would be straightforward to those in the art.

Figure 7:
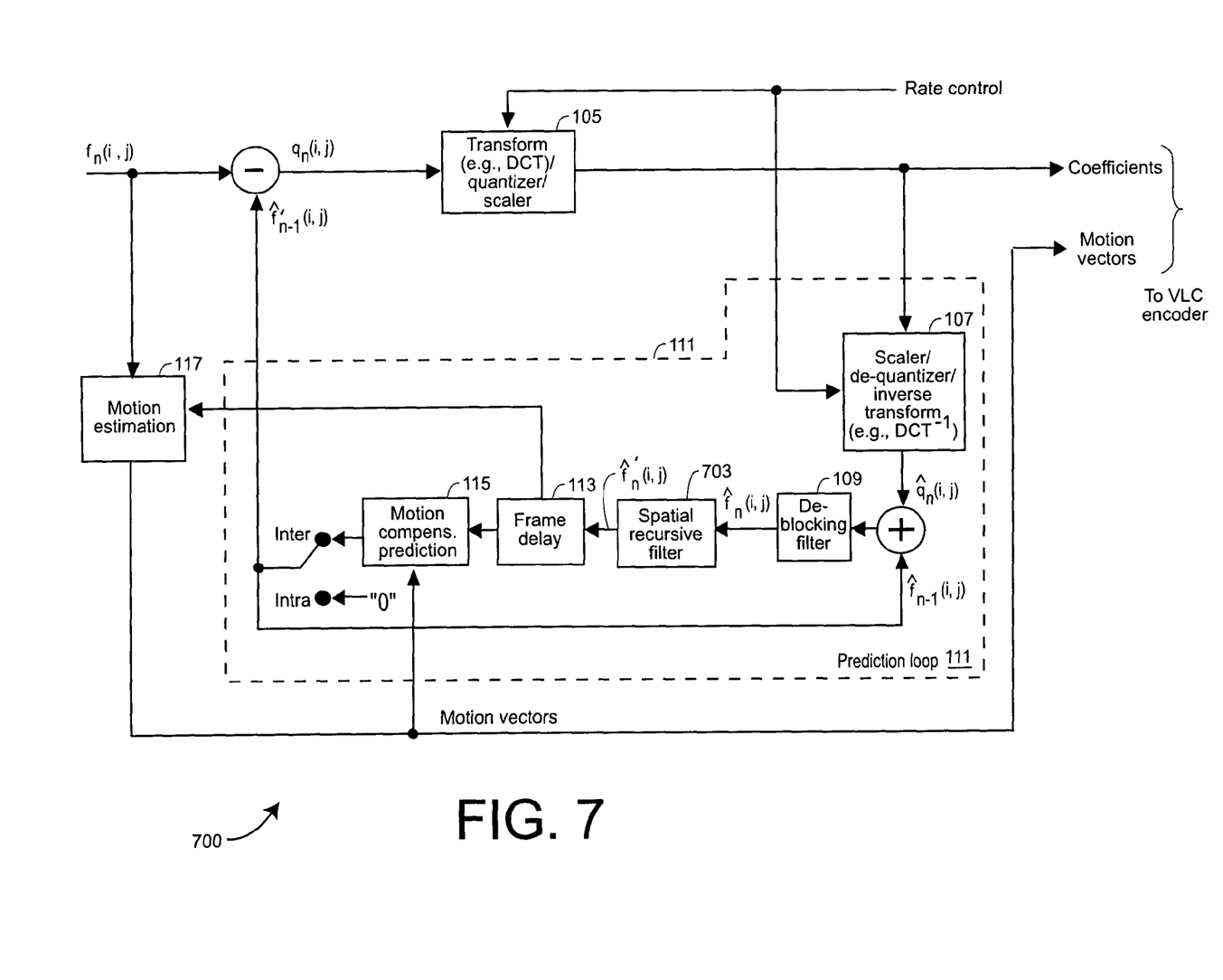
FIG. 7 shows a simplified block diagram of a second alternate embodiment of a motion compensated predictive coder that includes a spatial recursive filter in the prediction loop.

FIG. 7 shows a simplified block diagram of a second alternate embodiment 700 of a motion compensated predictive coder that includes a spatial recursive filter 703 in the prediction loop. In this embodiment, the spatial filtering of the filter 703 is prior to the delay and to the motion compensated predicting of motion compensated prediction block 115 so that the predicting uses a spatially filtered input to produce the spatially filtered estimate of the previous picture. How to design filter 703 from details above of how to design filter 203 would also be straightforward to those in the art. Also, those in the art would recognize that the de-blocking operation of de-blocking filter 109 and the operation of spatial filter 703 may be combined into a single, albeit more involved filtering operation.

Not shown in FIGS. 6 and 7 are blocks that determine a measure of the relative amount of quantization noise and that set the filter coefficients. In the embodiments of FIGS. 6 and 7, the neighborhood of any region being filtered rather than the whole picture (or picture block) is used so that sharpness is retained in the image. How to incorporate these blocks into the embodiments of either FIG. 6 or FIG. 7 would be clear to those in the art.

Note again that while the embodiment shown in FIG. 2 works with any decoder, the embodiments of FIG. 6 and 7 each require a compatible decoder that includes an appropriately placed filter. Therefore, in an improved version, the inclusion or not of the filter is configurable in the coder. Furthermore, an indication is sent in the output stream to indicate how to configure a decoder when a filter is included in the prediction loop of the coder.

Not shown in the embodiments described above are such details as the inclusion of delay elements that may be needed to match any delay formed by the de-blocking filter and also, in the case the spatial filter is in the prediction loop, by the spatial filter.

While the filters described above are first order recursive filters, on alternate embodiments, higher order filters are used that average more than the previous one line and/or previous one sample in the determining of the filter output. Furthermore, while the filters described above are first order recursive filters that include in the calculation the output at the immediate previous line and/or pixel for the determining of the output, a first order filter alternately may be used that includes in the calculation the output at the other-than-the immediate previous line and/or other-than-the immediate previous pixel for the determining of the output.

The picture sequence coding, e.g., video coding, and the spatial filtering methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a coding apparatus. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should further be appreciated that although the invention has been described in the context of motion compensated transform encoding of pictures, the invention is not limited to such contexts and may be utilized in various other compression applications and systems. Furthermore, the invention is not limited to any one type of architecture or type of transform encoding. For example, the DCT is one transform. Other transforms may be used, e.g., the new H.264/MEG-4 AVC video coding standard/draft standard defines 4x4 blocks and a DCT-like 4x4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in one embodiment for amplitude encoding, 127 possible non-zero values are possible for the coefficients. The invention however is not restricted to any number of possible quantization values.

Note also that the term amplitude is irrespective of sign. Therefore, for example, coefficient of values +1 and −1 both have amplitude 1.

Note that the terms coding and encoding are used interchangeably herein.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method comprising:
accepting into a processing system that includes a processor a picture of a time sequence of pictures;
generating, using the processor, a difference picture for the accepted picture, including:
forming quantized transform coefficients, including transforming image data and quantizing the transformed image data;
processing the quantized coefficients via a prediction processing loop that includes de-quantizing the quantized transform coefficients and inverse transforming the de-quantized quantizing transform coefficients to generate an estimate of the previous picture in the sequence; and
determining the difference picture from the accepted picture and the estimate of the previous picture; and
spatial filtering at least a component of the difference picture using a spatial filter such that the forming of quantized coefficients is from a spatially filtered difference picture, the spatial filtering acting on a filter input picture and producing a filter output picture,
wherein the spatial filtering is a noise reducing spatial filtering configured such that there is a fixed delay between the filter input picture and the filter output picture, the spatial filtering further configured such that the fixed delay is less than the time between two consecutive lines in the difference picture in the time sequence.

2. A method as recited in claim 1, wherein the filter input picture is the difference picture and the filter output picture is the spatially filtered difference picture.

3. A method as recited in claim 1, wherein the filter input picture and the filter output picture are in the prediction loop, such that a spatially filtered estimate of the previous picture in the sequence is used to determine the spatially filtered difference picture.

4. A method as recited in claim 3, wherein the filter input picture is the estimate of the previous picture in the sequence, and provides as the filter output picture the spatially filtered estimate of the previous picture.

5. A method as recited in claim 3, wherein the prediction loop includes a motion compensated predicting, and wherein the spatial filtering is prior to the motion compensated predicting so that the predicting uses a spatially filtered input to produce the spatially filtered estimate of the previous picture.

6. A method as recited in claim 1, wherein the fixed delay is at most a one line plus one pixel delay.

7. A method as recited in claim 1, wherein the spatial filtering includes recursive spatial filtering comprising:
for a particular line location and a particular pixel location of the filter output image, averaging the filter input picture at the particular line and pixel locations with one or more filter outputs that are at least at one of a different line location from the particular line location and a different pixel location than the particular pixel location, the averaging using one or more filter coefficients.

8. A method as recited in claim 7, wherein the filter coefficients are adaptively set according to a measure of the relative amount of quantization noise in the estimate of the previous picture or a function thereof prior to any filtering, such that when there is less quantization noise, less filtering occurs.

9. A method as recited in claim 7, wherein forming the quantized coefficients includes transforming the spatially filtered difference picture to form transform coefficients, and quantizing the transform coefficients, and wherein the prediction loop includes de-quantizing the quantized coefficients and inverse transforming the de-quantized coefficients to form a reconstructed difference image, and wherein the measure of the relative amount of quantization noise is obtained from the reconstructed difference image.

10. A method as recited in claim 9, wherein the quantized coefficients are quantized according to a quantization scale, and wherein each coefficient is set such that when the measure of the relative amount of quantization noise is below a threshold for the coefficient, the threshold dependent on the quantization scale, substantially no filtering takes place, and such that when the measure of the relative amount of quantization noise is above the threshold for the coefficient, the amount of filtering monotonically increases with the measure of the relative amount of quantization noise.

11. A method as recited in claim 10, wherein the thresholds corresponding to the coefficients are selected from a set of pre-selected thresholds according to the type of image.

12. A method as recited in claim 7, wherein the filtering of the filter input picture includes:
recursively and one-dimensionally spatially filtering the filter input picture in a first dimension of two dimensions of the filter input picture to determine a first filtered picture, the amount of one-dimensional recursive filtering in the first dimension according to at least a first filter coefficient;
recursively and one-dimensionally spatially filtering the filter input picture in the second dimension of the filter input picture to determine a second filtered picture, the amount of one-dimensional recursive filtering in the second dimension according to at least a second filter coefficient; and
forming a weighted sum of the results of recursively and one-dimensionally spatially filtering in the two dimensions, the weighted sum according a relative weighting coefficient.

13. A method as recited in claim 12,
wherein the one-dimensional spatial filtering in the first dimension includes, for particular first and second dimensions of the first filtered picture, averaging the present filter input picture at the first dimension with the first filtered picture at a previous location in the first dimension, the relative weighting of the present location and previous location in the averaging according to a first filter coefficient, and wherein the one-dimensional spatial filtering in the second dimension includes, for the particular first and second dimensions of the second filtered picture, averaging the present filter input picture at the particular second dimension with the second filtered picture at a previous location in the second dimension, the relative weighting of the present location and previous location in the averaging according to a second filter coefficient.

14. A method as recited in claim 13, wherein the first and second filter coefficients are adaptively set according to a measure of the relative amount of quantization noise in the estimate of the -previous picture or a function thereof prior to any filtering, such that when there is less quantization noise, less filtering occurs.

15. A method as recited in claim 14, wherein the quantized coefficients are quantized according to a quantization scale, and wherein each coefficient is set such that when the measure of the relative amount of quantization noise is below a threshold for the coefficient, the threshold dependent on the quantization scale, substantially no filtering takes place, and such that that when the measure of the relative amount of quantization noise is above the threshold for the coefficient, the amount of filtering monotonically increases with the measure of the relative amount of quantization noise.

16. An apparatus comprising:
means for generating a difference picture for an accepted picture of a time sequence of pictures, including:
means for transforming image data to form quantized transform coefficients, and means for quantizing for forming quantized coefficients from the quantized transform coefficients;
means in a prediction loop for generating an estimate of the previous picture in the sequence from the quantized coefficients, wherein the prediction loop includes means for de-quantizing the quantized transform coefficients and means for inverse transforming the de-quantized quantizing transform coefficients;
means for determining the difference picture from the accepted picture and the estimate of the previous picture; and
means for spatial filtering at least a component of the difference picture such that the forming of quantized coefficients is from a spatially filtered difference picture, the means for spatial filtering acting on a filter input picture and producing a filter output picture, wherein the means for spatial filtering is configured for noise reducing such that there is a fixed delay between the filter input picture and the filter output picture, and
wherein the means for spatial filtering is configured such that the fixed delay is less than the time between two consecutive lines in the difference picture in the time sequence.

17. An apparatus as recited in claim 16, wherein the filter input picture is the difference picture and the filter output picture is the spatially filtered difference picture.

18. An apparatus as recited in claim 16, wherein the filter input picture and the filter output picture are in the prediction loop, such that a spatially filtered estimate of the previous picture in the sequence is used to determine the spatially filtered difference picture.

19. An apparatus as recited in claim 16, wherein the fixed delay is at most a one line plus one pixel delay.

20. An apparatus as recited in claim 16, wherein the means for spatial filtering include means for recursive spatial filtering according to one or more filter coefficients.

21. An apparatus as recited in claim 20, wherein the filter coefficients are adaptively set according to a measure of the relative amount of quantization noise in the estimate of the previous picture or a function thereof prior to any filtering, such that when there is less quantization noise, less filtering occurs.

22. A computer-readable hardware storage medium storing instructions that when executed by one or more processors of a processing system cause the processing system to carry out a method, the method comprising:
accepting a picture of a time sequence of pictures;
generating a difference picture for the accepted picture, including:
forming quantized transform coefficients, including transforming image data and quantizing the transformed image data;
passing the quantized coefficients via a prediction processing loop that includes de-quantizing the quantized transform coefficients and inverse transforming the de-quantized quantizing transform coefficients to generate an estimate of the previous picture in the sequence; and
determining the difference picture from the accepted picture and the estimate of the previous picture; and
spatial filtering at least a component of the difference picture using a spatial filter such that the forming of quantized coefficients is from a spatially filtered difference picture, the spatial filtering acting on a filter input picture and producing a filter output picture,
wherein the spatial filtering is a noise reducing spatial filtering configured such that there is a fixed delay between the filter input picture and the filter output picture, the spatial filtering further configured such that the fixed delay is less than the time between two consecutive lines in the difference picture in the time sequence.

23. A computer-readable hardware storage medium as recited in claim 22, wherein the filter input picture is the difference picture and the filter output picture is the spatially filtered difference picture.

24. A computer-readable hardware storage medium as recited in claim 22, wherein the filter input picture and the filter output picture are in the prediction loop, such that a spatially filtered estimate of the previous picture in the sequence is used to determine the spatially filtered difference picture.

25. A computer-readable hardware storage medium as recited in claim 22, wherein the fixed delay is at most a one line plus one pixel delay.

26. A computer-readable hardware storage medium as recited in claim 22, wherein the spatial filtering includes recursive spatial filtering comprising:
for a particular line location and a particular pixel location of the filter output image, averaging the filter input picture at the particular line and pixel locations with one or more filter outputs that are at least at one of a different line location from the particular line location and a different pixel location than the particular pixel location, the averaging using one or more filter coefficients.

27. A computer-readable hardware storage medium as recited in claim 26, wherein the filter coefficients are adaptively set according to a measure of the relative amount of quantization noise in the estimate of the previous picture or a function thereof prior to any filtering, such that when there is less quantization noise, less filtering occurs.

28. An apparatus comprising:
a hardware subtractor configured to generate a difference picture from an accepted picture of a sequence of pictures, and an estimate of the previous picture in the sequence,
a signal path to generate the estimate of the previous picture the signal path comprising:
   a transformer to accept picture data and form quantized transform coefficients
   a quantizer coupled to the transformer to forming quantized coefficients;
   a de-quantizer coupled to the quantizer; and
   an inverse transofmer coupled to the de-quantizer; and
a prediction loop coupled of the de-quantizer to generate the estimate of the previous picture in the sequence; and
a hardware spatial filter in the signal path of the difference picture or in the prediction loop arranged to spatially filter at least a component of the difference picture such that the forming of quantized coefficients is from a spatially filtered difference picture, the spatial filter accepting a filter input picture and producing a filter output picture,
wherein the spatial filtering is a noise reducing spatial filtering configured to produce a fixed delay between the filter input picture and the filter output picture, the spatial filter further configured such that the fixed delay is less than the time between two consecutive lines in the difference picture in the time sequence.

29. An apparatus as recited in claim 28, wherein the filter input picture is the difference picture and the filter output picture is the spatially filtered difference picture.

30. An apparatus as recited in claim 28, wherein the filter input picture and the filter output picture are in the prediction loop, such that a spatially filtered estimate of the previous picture in the sequence is used to determine the spatially filtered difference picture.

31. An apparatus as recited in claim 28, wherein the fixed delay is at most a one line plus one pixel delay.

32. An apparatus as recited in claim 28, wherein the spatial filter processes the filter input picture by a recursive spatial filtering process that includes:
   for a particular line location and a particular pixel location of the filter output image, averaging the filter input picture at the particular line and pixel locations with one or more filter outputs that are at least at one of a different line location from the particular line location and a different pixel location than the particular pixel location, the averaging using one or more filter coefficients.

33. An apparatus as recited in claim 32, wherein the filter coefficients are adaptively set according to a measure of the relative amount of quantization noise in the estimate of the previous picture or a function thereof prior to any filtering, such that when there is relatively little quantization noise, relatively little filtering occurs.

* * * * *

UNITED STATES PATENT AND TRADEMARK OFFICE
CERTIFICATE OF CORRECTION

PATENT NO. : 7,885,341 B2
APPLICATION NO. : 11/255543
DATED : February 8, 2011
INVENTOR(S) : Wen-hsiung Chen et al.

It is certified that error appears in the above-identified patent and that said Letters Patent is hereby corrected as shown below:

In Column 4, line 6, before "denotes", kindly replace "n-i" with --n-l--.

In Column 5, line 4, after "previous line", kindly replace "(i-i)" with --(i-l)--.

In Column 15, line 14, after "coupled", kindly replace "of" with --to--.

In Column 15, line 23, after "wherein the spatial", kindly replace "filtering" with --filter--.

In Column 15, line 24, before "configured", kindly replace "filtering" with --filter--.

Signed and Sealed this
Twenty-second Day of March, 2011

David J. Kappos
*Director of the United States Patent and Trademark Office*